United States Patent
Martin

(10) Patent No.: US 6,438,746 B1
(45) Date of Patent: Aug. 20, 2002

(54) DCE FUNCTIONAL DIMENSIONING

(75) Inventor: Paul A. Martin, Suffolk (GB)

(73) Assignee: British Telecommunications public limited company, London (GB)

( * ) Notice: Subject to any disclaimer, the term of this patent is extended or adjusted under 35 U.S.C. 154(b) by 1013 days.

(21) Appl. No.: 08/658,272

(22) Filed: Jun. 5, 1996

(30) Foreign Application Priority Data

Jan. 16, 1996 (GB) ............................................. 9600854

(51) Int. Cl.$^7$ ................................................. G06F 9/45
(52) U.S. Cl. ..................................................... 717/149
(58) Field of Search .............................. 395/701–709; 717/149

(56) References Cited

U.S. PATENT DOCUMENTS 5,717,929 A * 2/1998 Furukawa et al. .......... 717/168

OTHER PUBLICATIONS

AT&T, UNIX System V, Programmers Reference manual, Prentice–Hall Inc,CPP((1)–pp. 1–4, Dec. 1989.*
Kathleen Jensen & Niklaus Wirth: "PASCAL: user manual and report", Springer–Verlag, ISBN 0–387–90144–2, New York, US XP002026362, Chapter 14: "How to use the PASCAL 6000–3.4 System", 1975.

Kuhn et al, "The KAP Parallelizer for DEC Fortran and DEC C Programs", Digital Technical Journal, vol. 6, No. 3, ISSN 0898–901X, US, pp. 57–70, XP000566668, 1994.

Martin, "Twenty Twenty Vision—Software Architectures for Intelligence into the 21$^{st}$ Century", BT Technology Journal, vol. 13, No. 2, ISSN 0265–0193, UK, pp. 120–131, XP000466657, 1995.

G Goos & J. Hartmanis (EDS.): "Lecture Notes in Computer Science", vol. 106, The Programming Language Ada—Reference Manual, Springer–Verlag, ISBN 3–540–10693–6, New York, US, XP002026321, pp. 11, 12, 86, 87, 127, 139, 140, 211, 212, 1981.

* cited by examiner

Primary Examiner—St. John Courtenay, III
(74) Attorney, Agent, or Firm—Nixon & Vanderhye P.C.

(57) ABSTRACT

A compiler is provided for a distributed object system in which functional requirements on system performance criteria can be entered as comment fields in an object-oriented language (e.g., C++) which are ignored by a conventional compiler (to allow compilation of a single processor version of the program for debugging) but which are interpreted by a pre-compiler to take into account system data when compiling code for host computers of the distributed system. The system is preferably a telecommunications system.

18 Claims, 11 Drawing Sheets

| 1000a | 1000b |
|---|---|
| class Customer { | // avail=99.99% |
| char name[32]; | // ACL css=rw,other=r; |
| public: | |
| Customer(char*nm); | // ACL css=x; |
| void printBill(); | // Time 0/100/10000;<br>// Time 0/10000/1000000; |
| void callDelivered(); | // Time 0/10/1000; |
| }; | |

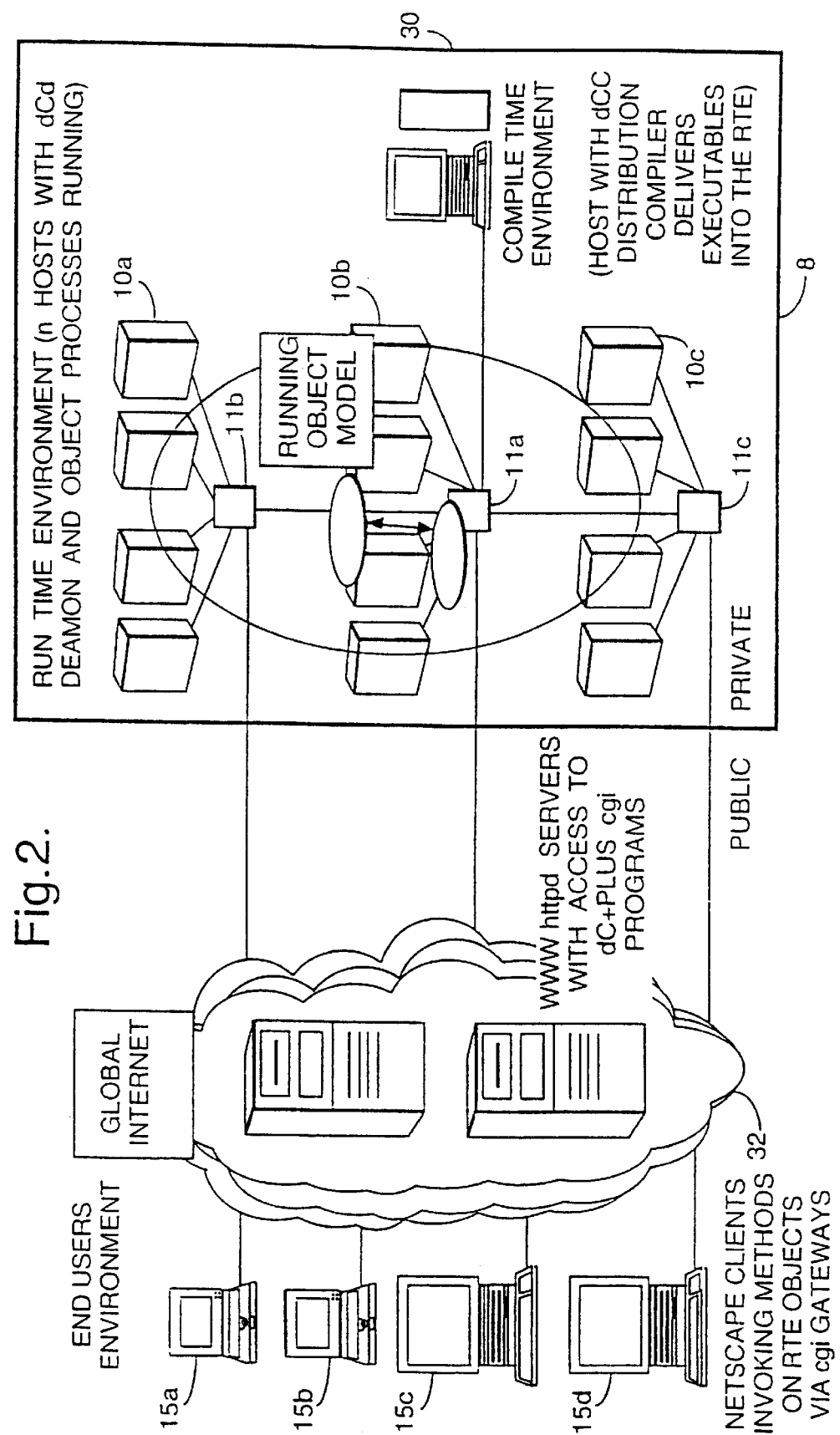

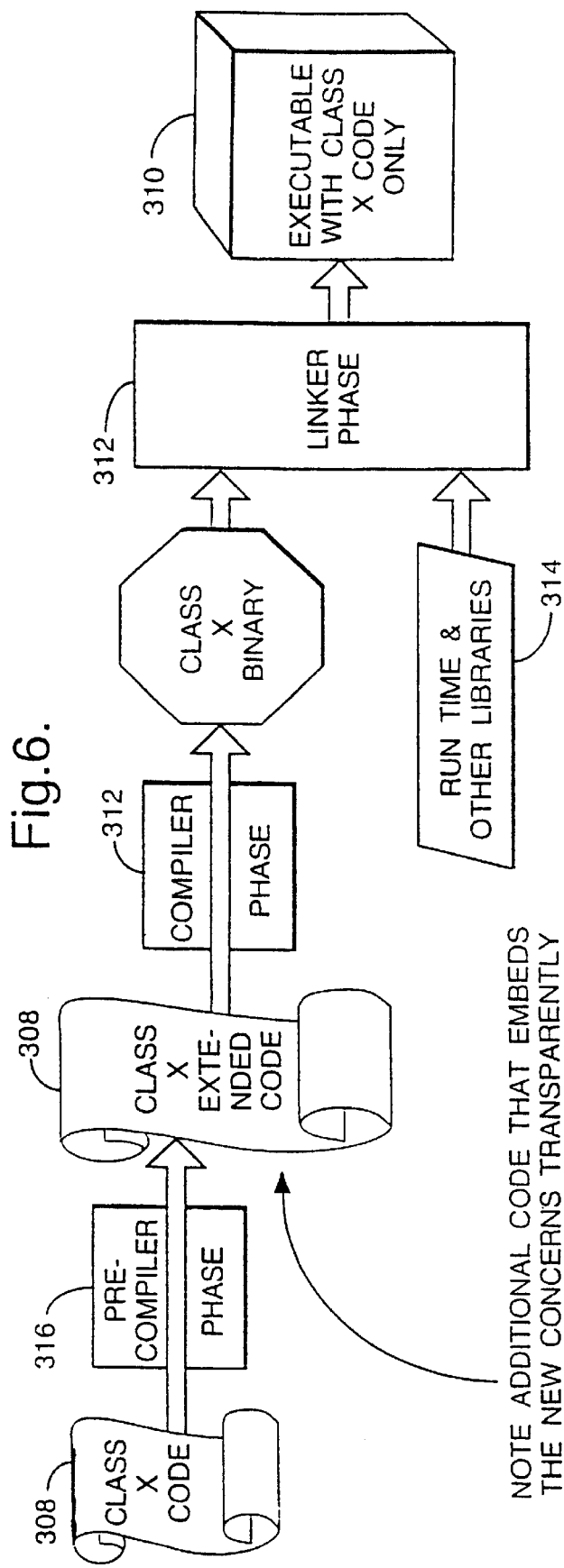

Fig.8.

| | |
|---|---|
| CUSTOMER TYPE | "EMPLOYEE" |
| U ID | 71 |
| HOST | "132.146.12.105 |
| NORMAL NO. | "0171-111-1111" |
| REROUTE NO. | "0171-222-2222" |
| REROUTE TIMES | 0700-2100 |
| CALL LOG | (NO.) (DATE) (TIME) (COST) |
| | ⋮ |
| | ⋮ |
| | ⋮ |

Fig.9.

| 1000a | 1000b |
|---|---|
| class Customer { | // avail=99.99% |
| char name[32]; | // ACL css=rw,other=r; |
| public: | |
| Customer(char*nm); | // ACL css=x; |
| | // Time 0/100/10000; |
| void printBill(); | // Time 0/10000/1000000; |
| void callDelivered(); | // Time 0/10/1000; |
| }; | |

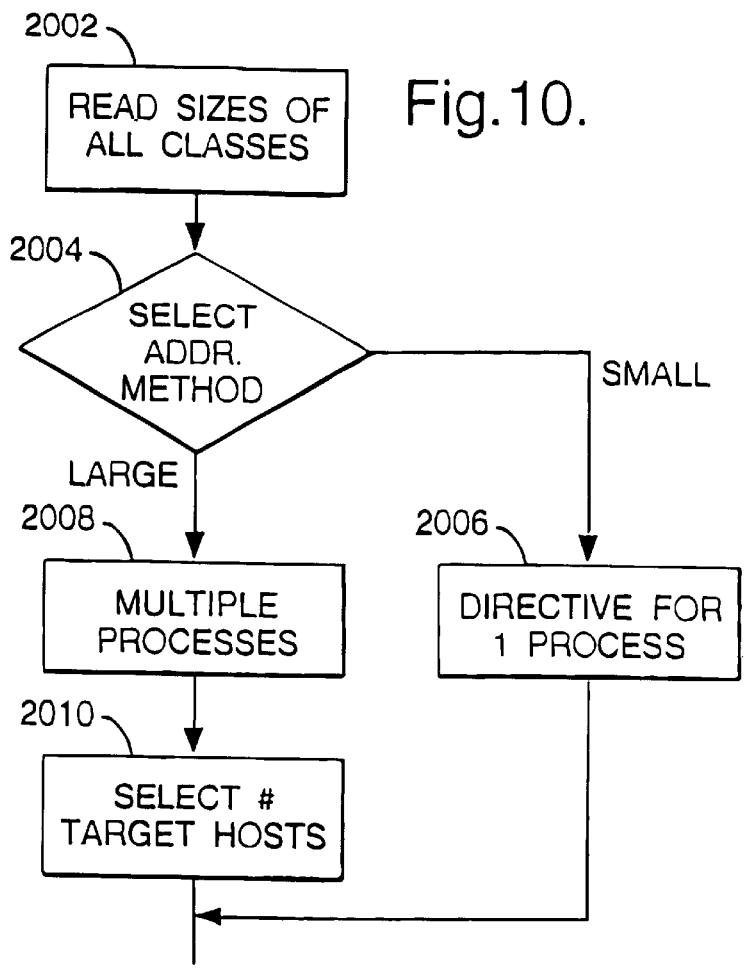
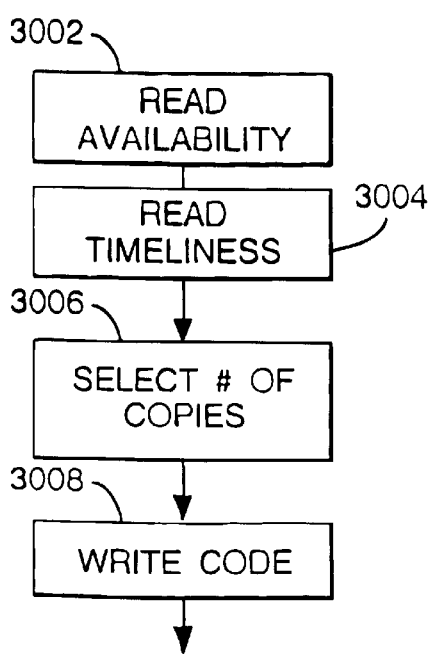

DCE FUNCTIONAL DIMENSIONING

BACKGROUND OF THE INVENTION

1. Field of the invention

This invention relates to distributed processing, particularly but not exclusively distributed processing for control of a telecommunications network. More particularly, this invention is concerned with developing and updating the control systems implemented on the distributed processors, which are preferably (but not necessarily) processes implemented in an object-oriented fashion.

2. Related Art

Telecommunications networks are increasingly required to support high bandwidth, low delay information flow. The bandwidth required is rapidly progressing from kilobits per second to megabits per second and even, for some applications, gigabits per second (particularly, for example, for video on demand; animated shared simulations, and distributed computing).

To provide "intelligent network" facilities such as call redirection to particular numbers, computer programs run on a number of host computers (up to 100, for example) connected with switching centres. The way in which services are to be provided for particular customers (for example, a particular number to which calls for a customer are to be routed) depends upon data stored in relation to that customer on the host computers. Thus, there may be many millions of subscriber records on tens or hundreds of host computers.

In "Twenty-twenty vision—software architectures for intelligence in the 21st century", P. A. Martin, BT Technol J Vol 13 No. 2 April 1995, the present inventor has proposed the use of object-oriented techniques to implement the distributed processing required.

A description of object oriented technology will be found in, for example, BT Technol J Vol. 11 No. 3 (July 1993), "Object oriented technology", edited by E. L. Cusack and E. S. Cordingley. Although the term is not always used with precision, object oriented computing here refers to the computing technique in which data is stored in "encapsulated" form in which, rather than being directly accessible by a calling program or routine, the data is accessible only by an associated program which can read, write and edit the data. A record of data and its associated programs are referred to as an "object". Communication to and from an object is generally by "message passing"; that is, a call to the object passes data values and invokes the operation of one of the programs comprised within the object, which then returns data values.

Various languages are available for programmers who wish to use the objected oriented approach. Of these, the commonest at present is C++.

Distributed processing differs from single processor operation in several respects. Firstly, different access techniques may be required depending on whether other programs or data are located on the same host computer as a calling program or on a different host computer. The location of a program or data will also affect the speed with which it can be reached from another program. Also, one or more host computers may fail whilst leaving others in operation.

Distributed computing is conventionally performed, by using a "client-server" arrangement in which a "client" program on one computer interrogates a "server" program on another computer which then performs the function or returns the data required by the client program.

Object oriented techniques have not widely been applied to distributed processing. A summary of the state of the art in this respect may be found in "Object oriented programming systems"; Blair G., Pitman Publishing, London, 1991 (ISBN 0-273-03132-5) and particularly in Chapter 9 at pages 223–243; "Distributed systems and objects"; David Hutchison and Jonathan Walpole. Previous attempts have generally added new syntax to an existing computer language, or have created new computer languages, to extend conventional object oriented programming to deal with distributed processing.

SUMMARY OF THE INVENTION

In one aspect, the present invention provides a compiler (or pre-compiler) for generating code for use in distributed processing on a plurality of host computers (for example for controlling telecommunications systems) which is arranged to receive a source program written in a computing language, comprising first statements which are compilable by other compilers, the compiler or pre-compiler being arranged to operate on second statements which will be ignored by said other compilers to adapt the program for multiprocessor operation. Preferably, the second statements are in comments fields.

Conveniently, this aspect of the invention comprises a pre-compiler which can then be used with a more conventional compiler, but will be recognised that the functionality of the invention could be incorporated directly into a re-written compiler.

Thus, according to this aspect of the invention, the source code may be compiled and tested for execution by the author of the program on a single processor by a conventional compiler, the second statements specific to the multiprocessor, environment being ignored by the single host compiler, prior to being compiled to execute on a multiprocessor system by the compiler of the invention. This enables the programmer to validate the basic operation of the program without need to test it in real time.

In another aspect, the present invention provides a compiler for a distributed object system, which in functional requirements on system performance criteria can be entered and are interpreted during compilation to ensure that the function or requirements are met.

For example, the system performance criteria may be response time, number of objects, or integrity of data.

Preferably, in this aspect, functional requirements can be stored for each object and/or class of objects.

Conveniently, the functional requirements are specified using the second statements referred to in the first aspect above.

Other aspects and embodiment of the invention are as described and claimed hereafter.

BRIEF DESCRIPTION OF THE DRAWINGS

Embodiments of the invention will now be illustrated, by way of example only, with reference to the accompanying drawings in which:

FIG. 2 is a block diagram illustrating further embodiments of the system of FIG. 1;

FIG. 6 is an illustrative drawing indicating the products of stages of processing performed in FIG. 5;

FIG. 8 illustrates the data structure within memory of one component of FIG. 7a;

FIG. 9 illustrates source code of which the compiler apparatus of FIG. 4 is applicable;

FIG. 10 is a flow diagram illustrating part of a pre-compiler process comprising FIGS. 10 to 14;

FIG. 11 is a further part of the process;

DETAILED DESCRIPTION OF EXEMPLARY EMBODIMENTS

Figure 1:
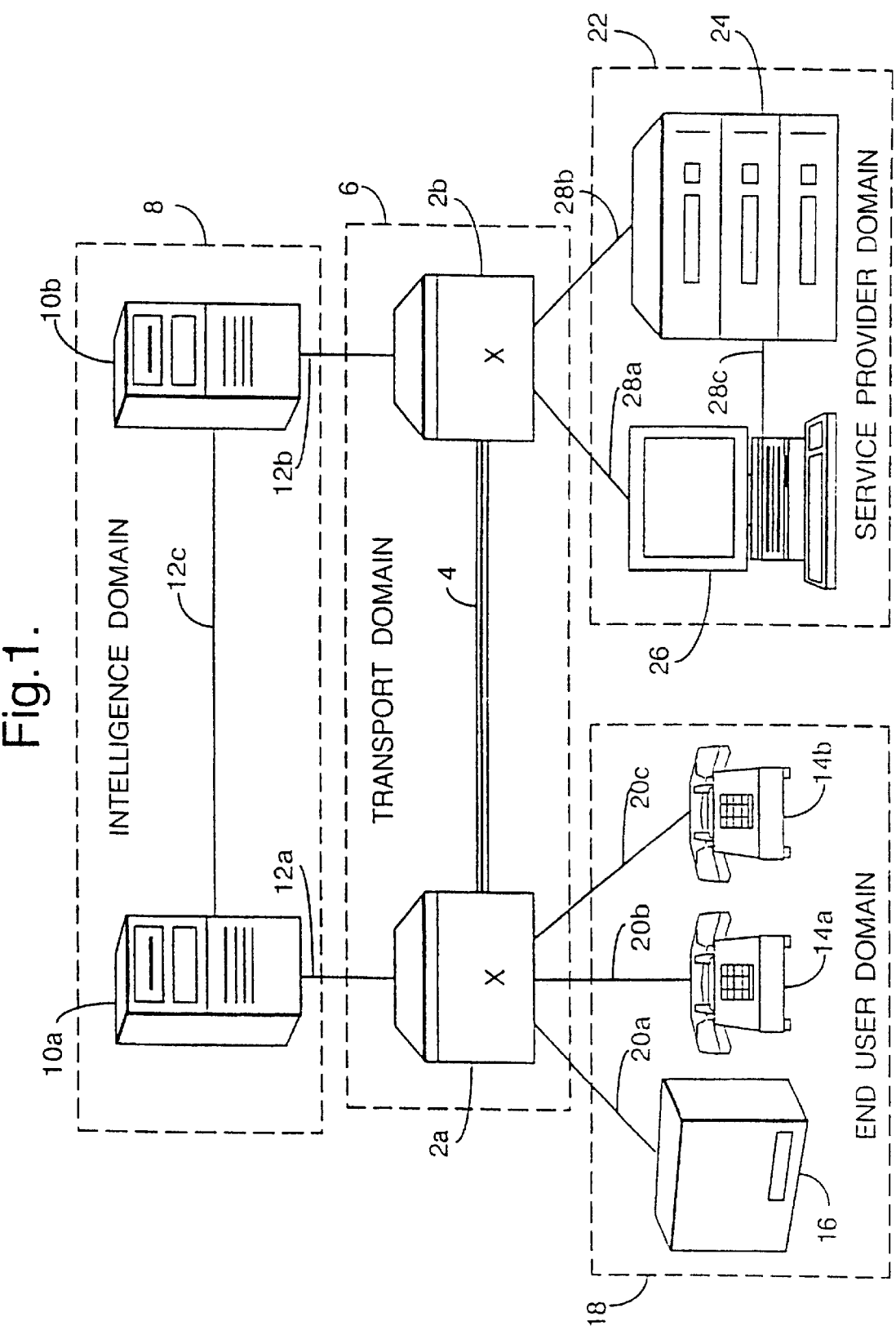
FIG. 1 is a block diagram illustrating the elements of telecommunications systems embodying the invention.

Referring to FIG. 1, a telecommunications system produced according to the invention comprises a plurality of switching centres or exchanges 2a, 2b interconnected by communications channels 4 (e.g. microwave links, fibre-optic cables, coaxial copper cable or virtual circuits carried on any of the foregoing) making up a transport domain 6. Connected to the transport domain 6 is an intelligence domain 8 comprising a plurality of host computers 10a, 10b in signalling communication with the switch centres 2a, 2b via signalling links 12a, 12b, 12c which also interconnect the host computers 10a, 10b. For example, the two may be interconnected using protocols such as signalling system 7 (SS7).

End user apparatus such as telephones 14a, 14b and broad bandwidth communication devices such as video players 16, jointly comprise an end user domain 18 connected to the transport domain 6 via local loop connections 20a, 20b, 20c (for example optic fibre, cellular radio or twisted pair copper cable links).

Further provided is a service provider domain 22 consisting of equipment for providing services (for example video services), such as a video player 24 and a computer terminal 26, connected with the transport domain 6 via local loop connections 28a, 28b, 28c such as ISDN channels or other high bandwidth links.

In known fashion, an end user terminal 14 or 16 is used to pass a request, via the transport domain 6 to the service provider domain 22. As a result, a channel is set up through the transport domain 6 and the service provider domain 22 transmits a service via the channel to the end user domain 18 (for example by transmitting a real time video film, or a file of data in electronic format).

In conventional plain old telephone services (POTS), the transport domain 6 is controlled simply by the dialled numbers generated in the end user domain to set up the transport path. However, currently, "intelligent network" control of the transport domain is provided by the intelligence domain 8. The intelligence domain 8 receives from the transport domain 6 the dialled number and/or the dialling number, and performs some call processing in accordance with either the dialled or the dialling number, or both. The intelligence domain typically provides number translation services, where a dialled phone number is translated to provide a call forwarding service to another number. In this case, the dialled number corresponds to a stored record on one of the host computers 10, which is accessed in response to a signal on one of the links 12, to generate a corresponding re-direction number.

In general, in response to the occurrence of an event in the transport domain 6 (such as the initiation of a call from the end user domain 18) the intelligence domain supplies control information to control the transport domain 6.

Other data is also stored within the intelligence domain. In this embodiment, billing data for each call is stored in the intelligence domain, to enable periodic billing of each customer.

Referring to FIG. 2, the intelligence domain 8 further comprises a compiler apparatus 30, consisting of a programmed workstation, connected to the host computers 10 via network servers 11a–11c and a wide area network (WAN) running between the compiler apparatus 30, the hosts 10 and the servers 11.

The servers are also connected to one or more World Wide Web (WWW) server computers comprised within the Internet 32, and hence to editing terminals 15a–15d connected to the Internet (e.g. via a local packet switching node).

Figure 3:
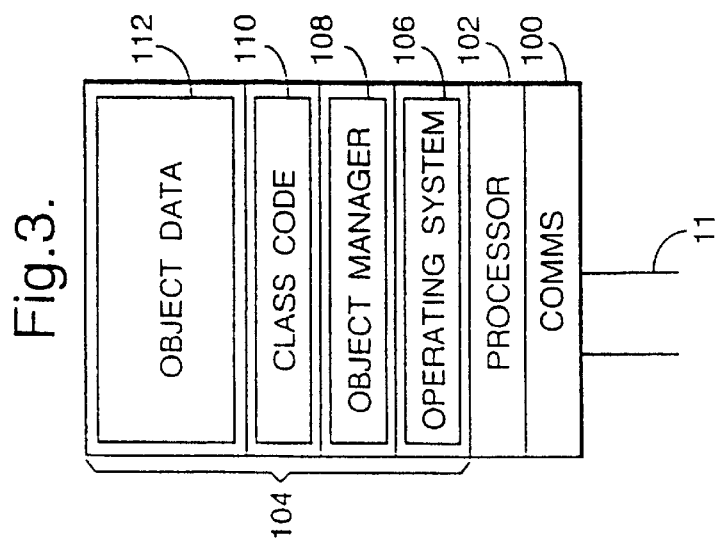
FIG. 3 is a block diagram illustrating the elements of host computer forming part of the system of FIGS. 1 and 2.

Referring to FIG. 3, each host computer 10 comprises a mainframe or server comprising communications hardware 100 connected via the WAN to the servers 11; a processor 102; and storage 104, comprising both rapid access storage in the form of random access memory and offline storage in the form of magnetic or optical disc drives.

Stored within the storage apparatus 104 are an operating system 106 (e.g. UNIX™); an object manager program 108; and an object model comprising class code 110 and object data, all of which will be discussed in greater detail below.

Each editing terminal 15 comprises a personal computer, and may be connected via modem to a common telephone socket with a corresponding telephone 14 at a user's premises.

Each editing terminal 15 therefore comprises a processor, a screen output device, an input device (e.g. keyboard and (or cursor control device such as a mouse), and storage apparatus ROM, RAM and a hard disc) containing a graphical user environment (e.g. Windows™), a communications program and object browser program.

Figure 4:
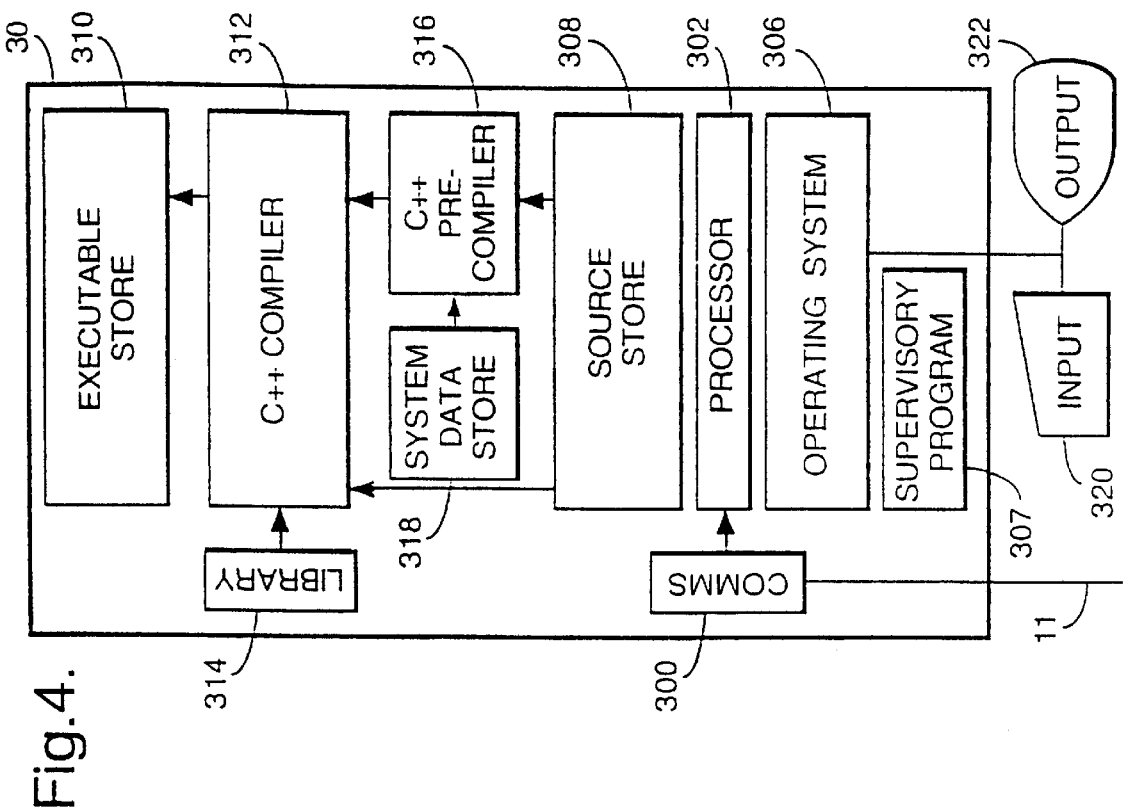
FIG. 4 is a block diagram illustrating the elements of a compiler apparatus forming part of the system of FIGS. 1 and 2.

Referring to FIG. 4, the compiler apparatus comprises a communications interface circuit board 300 connected to the WAN servers 11; a processor 302; and a storage apparatus 304 (not indicated separately) comprising rapid-access memory (RAM) and high capacity memory (e.g. a hard disc drive) and storing an operating system (e.g. UNIX ™), a C++ compiler program 312) (such as SunPRO available from Sun Microsystems); a pre-compiler 316 to be described in greater detail below; and a library 314 storing standard functions and definitions (specifying subprograms or subroutines) to be incorporated into new programs.

The C++ compiler comprises, as is conventional, a compiler which compiles to relocatable binary code and a linker program 312b which concatenates the binary code with the binary code routines stored in the library 314 and locates the concatenated code in a memory address space for execution.

Such compilers also generally include a pre-processor which interprets compiler directives such as "include" statements to read in additional code or perform other operations during compilations.

Also provided are: a storage area 308 for storing input source code defining a C++ program (e.g. input via the input device 320, or downloaded via the communications circuit 300, or loaded via a disc drive comprised within the storage apparatus 204); and a storage area 310 for storing executable code generated by the C++ computer 312 (i.e. by the processor 302 acting under control of the compiler program). Also included is a storage area 318 which stores system data concerning the number of distributed processors 10; the capacity of the available storage memory on each of the processors 10; the speed of operation of the processors 10 and so on.

The processor 102 is arranged to selectively run either the C++ compiler 312 on the source code in the source store 308, or the pre-compiler 316 followed by the C++ compiler 312 on the source code in the source store 308, to generate executable code in the executable code store 310.

In the former case, the code generated will execute on any suitable single processor. The processor 302 is, in the embodiment, itself arranged to be capable of executing the code directly generated in this manner by the C++ compiler, enabling the user to test immediately whether the program operates generally as expected.

In the latter case, the pre-compiler 316 first processes the source code in the source store 308 (taking into account any system data relating to the distributed system comprising the host 10 on which the code is to be executed), and generates amended source code in the source store 308 which is then compiled by the compiler 312 to generated executable code in the executable code store 310. This executable code is, however, not necessarily executable on the compiler apparatus 30 since it is for execution on the multiple distributed hosts 10.

Figure 5:
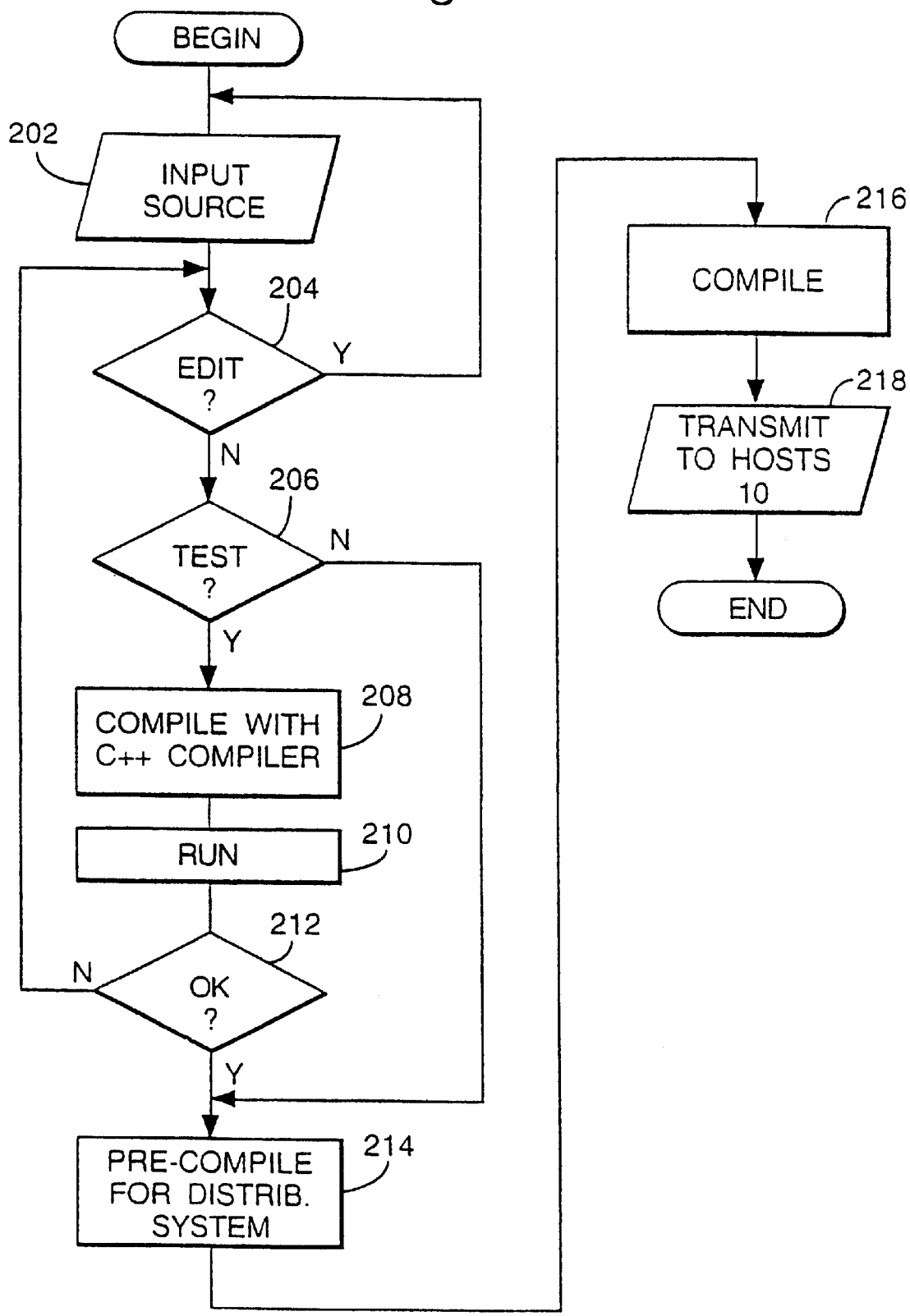
FIG. 5 is a flow diagram illustrating the operation of the compiler apparatus of FIG. 4.

Referring to FIG. 5, the general operation of the compiler 30 under control of the supervisory program 307 is as follows.

In a step 202, source code is input into the source code store 308 (e.g. via the input device 320). In a step 204, the human operator may decide to edit the source code in the source store 308, in which the edited text is input into the source store 308 (e.g. using a conventional text processor).

Once any such editing is complete, in a step 206, the user may elect whether or not to test the source code locally. In the event that he does so, in a step 208 the processor executes the C++ compiler 312 on the source code in the source store 308 to produce executable code in the executable code store 310, and in a step 210 the processor 302 executes the executable code. A simulation program may be provided to intercept meaningless operations and substitute operations such as displaying on the output screen 322, to enable the user to see what is happening.

In the event that errors occur in the execution, in a step 212 the user may decide to return to step 204 to edit the source code in the source code store 308. If the source code appears satisfactory, then in a step 214, the pre-compiler 316 is applied to the source code in the source code store 308 to generate amended code, which is then compiled in a step 216 by the C++ compiler to generate executable code in the executable code store 310. This is then transmitted to the distributed host computers 10 in a step 218 via the WAN servers 11. This is illustrated graphically in FIG. 6.

The data model employed within the intelligence domain will now briefly be described. In the following, each "object" is a data record comprising a number of fields of data, which is accessed only by code which corresponds to that object (in a one to many relationship, in the sense that the same code which relates to a class of objects actually accesses all objects of that class).

As is conventional, objects are grouped into classes, the objects of the same class containing different data but in the same format. Each object is associated also with one or more subroutines (generally termed "methods" or "functions") which operate on the data, and which generally constitute the only means of doing so.

The formats in which the subroutines associated with different objects of the same class will receive and return corresponding data are the same (i.e. all objects of the same class have a common interface). In fact, in C++ the subroutines are only represented once for all objects of the same class (i.e. the code for the sub routines is only stored once) so that the code and the objects are in a one to many relationship. The code is therefore associated with the class of the objects rather than with each object.

Each class of object may be a subdivision of a more generic class, as is conventional in object oriented programming. In this case, the code may be stored instead in relation to the more generic class (the "superclass"). The object manager 108 contains a list of the locations of the data making up each object, and on each invocation of (i.e. call to) an object, the object manager accesses the relevant subroutine code within the class code storage area 110 and supplies to the code the address of the data for the relevant object within the object storage area 112.

Figure 7A:
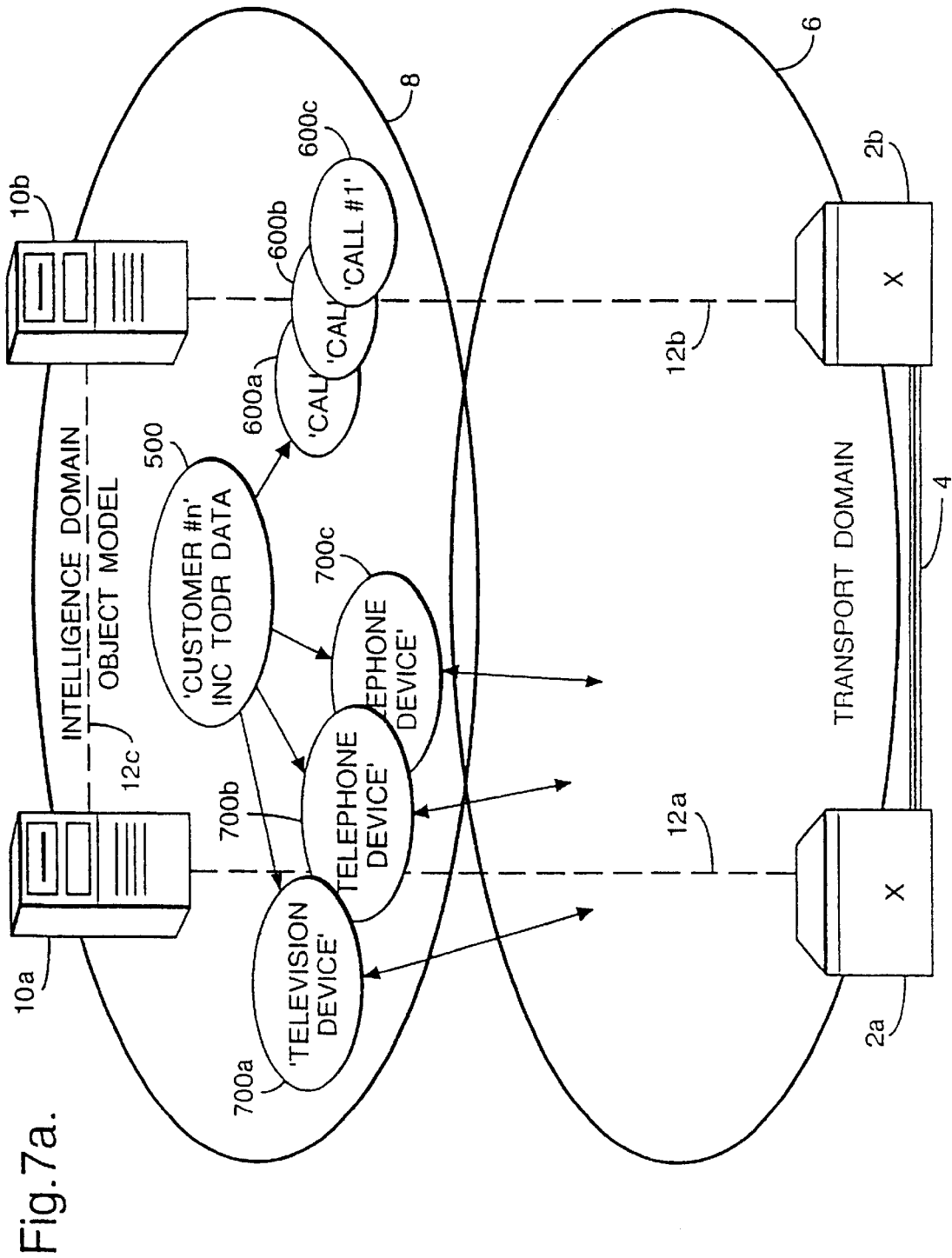
FIG. 7a is a diagram representing the structure of data held within the intelligence domain forming part of FIG. 1.

Referring to FIG. 7, in this embodiment the objects provided within the hosts 10 of the intelligence domain comprise a plurality of customer objects 500 (one holding data relating to each of tens of millions of customers) which are created on the accession of a new customer; destroyed when the customer voluntarily departs or is cut off from the network; and edited when a customer's requirements change: a plurality of call objects 600a–600c which are created at the outset of call and destroyed after the termination of the call; and a plurality of communication device objects 700a–700c which each relate to an item of customer terminal equipment and are created on first connection of that customer terminal equipment to the network.

Figure 7B:
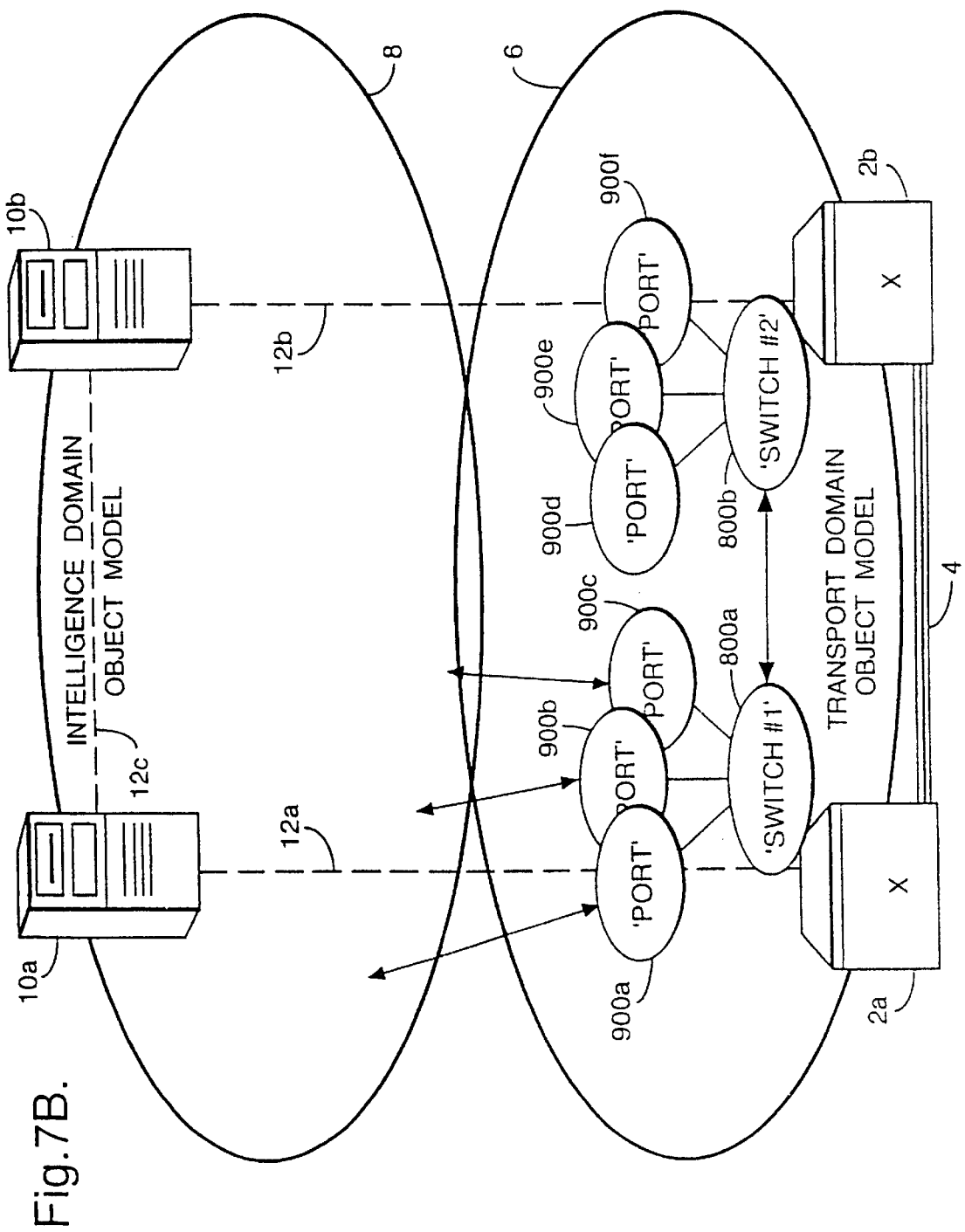
FIG. 7b is a diagram representing the structure of data held within the transport domain forming part of FIG. 1.

Referring to FIG. 7b, in this embodiment the switching centres 2a, 2b . . . of the transport domain 6 further comprise host computers on which are stored objects 800a–800b, 900a–900f which represent, respectively, the switches and the ports of the switches within the switching centres. Thus, each switch object 800 contains a record of the state of the corresponding switch at any moment; these objects exist permanently in memory and have a one to one mapping to the physical devices present in the switching centres 2, so that writing to the port or switch objects changes the state of the respective ports or switches, and reading the port or switch objects gives an accurate reflection of the actual condition of the corresponding physical devices.

By way of example, the structure of data within a customer object is illustrated in FIG. 8.

The attribute data maintained by the object 500 comprises a customer type field 502 (which may indicate that the customer is an employee or some other unusual status, or is a normal customer); a user ID field 504; a host field 506 indicating the host 10 on which the object 500 was created (conveniently in http/TCP/IP format).

Also stored is data relevant to the services provided to the customer; for example, the normal telephone number of the customer (field 508); a telephone number to which the customers calls are to be re-routed at particular times of day (field 510); and the times of day during which calls are to be re-routed (field 512).

Finally, billing information for the customer is stored, in the form of a call log field 514 storing, for each call, the called (and/or calling) telephone number, the date and time of the call, and the cost of the call (field 514).

Different parts of this information need to be accessed by different individuals. For example, the fields 508–512 which define the service to be offered to the customer may be edited by customer service personnel or by the customer himself via an end user terminal 15, whereas billing data (field 514) should be writable only by the billing and accounting personnel operating the network. Certainly, no customer should be able to re-write his billing records from an end user terminal 15.

In operation, the occurrence of events in the transport domain (such as the monitoring of an "off hook" condition within the end user domain) invokes the operation of the code associated with an object in the intelligence domain. For example, on a telephone going off hook in the end user domain, the code to create a new "call" object 600 is invoked. When the called number is detected, it is transmitted via the signalling links 12 to the intelligence domain 8; the customer object 500 of the calling party is activated to amend the billing record field thereof; and the customer object 500 of the called party is accessed to determine the number to which the call should be forwarded, which information is then transmitted to the switch objects 800 within the transport domain to set up the path over which the call will be carried.

During the passage of a call, the role of the intelligence domain is usually limited. On clearing down a call on-detection of the on hook event, the billing function code associated with the customer object(s) 500 updates the billing data field, and the call object is deleted by the object manager 108.

FIG. 9 illustrates C++ source code 100 which declares a class type (Customer) which corresponds to the data of FIG. 8. It comprises a portion 1000a consisting of statements acted on by the C++ compiler 312, and a portion 1000b consisting of comment statements ignored by the C++ compiler 312.

According to the present embodiment, however, the comment statement portion 1000b is acted upon by the pre-compiler 316. Each comment statement 1002b–1012b is preceded by a '//' symbol instructing the compiler 312 to ignore the following text.

The content of the comments field is intended entirely as documentation for the programmer and hence it is ignored completely by the C++ compiler 321. In the present embodiment, the pre-compiler 316 is arranged to interpret the comment statements.

In the present embodiment, the text in the comment fields comprises functional (or performance) specification data relating to the objections which will make up the distributed system. Specifically, the specification data includes data specifying the following:

(a) number of objects (or total corresponding volume of memory space) expected in a given class (b) availability i.e. the percentage of access instants on which the object must be available for access (c) accessibility—i.e. the number of different access points from which the object (or particular data within it may be called (e.g. the number of terminals or mainframes which will need to access the object)

(d) security—the access rights which various users are to have to various data (i.e. whether they are to have access at all and, if so, whether they can read, write or both)

(e) concurrency—i.e. the number of other processes which might simultaneously be invoking a given object or process (f) timeliness—i.e. the maximum, average and/or minimum time within which a process must be completed.

Typical values of some of these functional criteria for various applications are below:

Some Potential Applications and their Functional Dimensions

|  | Size (mb) | Availability (%) | Access (points) | Concurrency (applications) | In-Integrity (Yes/No) | Timetegrity (Min/Ave/Max) |
|---|---|---|---|---|---|---|
| Intelligent Telephone Networks | 1,000 | 99.999 | 100 M | 10,000 | Yes | 0/1/100 |
| Tele-Presence | 10 | 90 | 10 | 2 | No | 0/0/0 |
| Shared Virtual Reality | 100 | 90 | 100 | 10 | No | 0/1/2 |
| Enterprise Computing | 100,000 | 99.99 | 10 M | 1,000 | Yes | 0/1/10 |

Referring back to FIG. 9, statement 1002a defines a class of objects called "Customer" and statement 1002b specifies that objects of this class must be available 99.99% of the time.

Statement 1004a defines a 32 byte array called "name" and statement 1004b specifies that customer support service (CSS) processes must have read and write access to the contents, and any other process must have read only access (so that only customer support services staff can alter the subscriber name stored in an object of the class customer, which relates to a single customer).

Statement 1008a defines a function "Customer", and statement 1008b specifies that customer support services have access. Statement 1006b specifies minimum, average and maximum performance times (in milliseconds) for the function "Customer".

Statement 1010a declares a void function (i.e. one that returns no result) entitled printBill, which prints the bill for the customer object, and statement 1010b specifies the corresponding minimum, average and maximum response times.

Finally statement 1012a declares a void function called callDelivered, which is invoked when a call has to be handled and statement 1012b specifies the minium, average and maximum response times for the function.

As it stands, therefore, the code of FIG. 9 comprises executable C++ statements 1000a, and comments 1000b, and it can be compiled as a C++ program which will execute normally, the compiler 312 paying no heed to the functional specification defined by the comments statement 1000b.

On the other hand, when processed by the pre-compiler 316, the functional criteria 1000b have effects both in generating new compilable C++ code and in generating directives to the compiler, as described in greater detail below.

Size/Number of Objects

Each class of objects may be associated with a size statement, indicating either the number of objects that class which are expected or the corresponding amount of storage space required. In general, preferred embodiments of the invention are arranged to interpret statements relating to the number of objects expected (since this comes more naturally to a programmer) and to convert this into a required memory size by multiplying the thus declared number of objects by the sum of the sizes of the declared data types for the class.

Referring to FIG. 10, the pre-compiler is arranged, in a step 2002, to read any size statements associated with classes and to convert each into a memory space size (in Megabytes), and form the sum of all such memory sizes.

If the total size of the object model thus calculated is small enough to fit within a single one Megabyte UNIX process, the pre-compiler writes a directive to the compiler to compile the code to a single process (step 2006). This simplifies the addressing which may be employed, as the compiler may then allow objects to pass data by reference since all objects will be in the same address space.

Otherwise, in step 2008, the pre-compiler 316 writes a directive to the compiler to compile the code into multiple UNIX processes. In step 2010, the pre-compiler 316 may select the minimum number of target host processors to which the code is to be compiled.

The selection steps 2004 and 2010 may be performed in accordance with the data stored in the system data store 318 indicating how much memory is available in each of the hosts 10.

In other embodiments, the size of the object model thus calculated may also be used to control addressing methods in other ways; for example, the size of the object model may be used to instruct the compiler to select between using memory addressing (where all objects can be located within the same memory space); file addressing (for larger numbers of objects) or object UIDs; or to use virtual memory pointers.

Availability

One particular method of ensuring high availability of a particular object is to create multiple copies of the object (and, of course, to update, insofar as is possible, the data in all copies to be identical). The availability of a given object is roughly inversely proportional to the time taken by that object to respond. Thus, the number of copies of an object which may be desirable is roughly proportional to the ratio of the availability and the average response time of the object.

Accordingly, referring to FIG. 11, in a step 3002, the pre-compiler 316 is arranged to read the required availability for a class of objects and, in a step 2004, to read the average performance time indicated for objects of the class.

Then, in a step 3006, the pre-compiler selects the number of copies of an object to exist in parallel to give the required degree of availability, and in a step 3008, the pre-compiler extends the constructor code for that class (which instantiates new objects of the class) to cause the required number of copies simultaneously to be created (on different hosts 10) in runtime.

The number selected in the step 3006 will generally be one (in which case the pre-compiler 316 writes no additional code in the stage 3008) so as to maintain data integrity, except where high availability is required in which case two or more copies are selected as indicated above based on the class response time and required availability.

In other embodiments, rather than referring to target access times and creating a desired number of replica objects in accordance therewith, a predetermined number of replica objects may be selected (for example two) and the access times for objects may be altered (within the prescribed minimum and maximum described below in greater detail) to accommodate this.

Accessibility

As different host computers 10 are connected to different points in the WAN 11, 12, some particular host computers 10 have shorter communications paths to particular terminals 15 or hosts 10 than others. This data is stored in the systems data memory 318. It is therefore advantageous to store objects at hosts 10 which are connected to those terminals which will access them.

Figure 12:
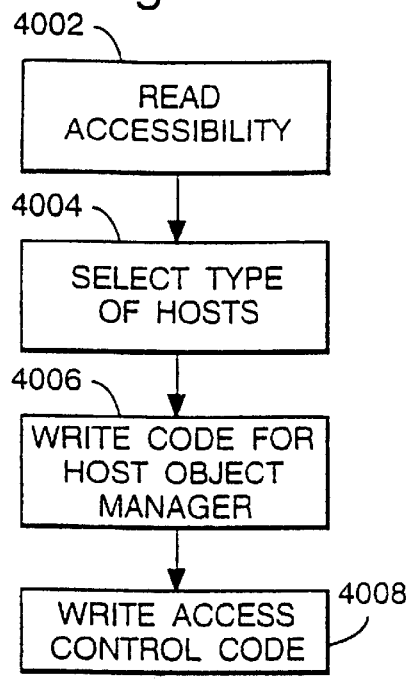
FIG. 12 is a further part of the process.

Referring to FIG. 12, in a step 4002 the pre-compiler 316 reads, for each data declaration, the identity (e.g. user, customer support, service provider, billing or regulatory) and number of terminals 15 which will access the objects of that class, and, in step 4004, determines the host computers 10 on which new objects of that class should be stored to give best access to these terminals, using the data stored in the system data memory 318.

In a step 4006, the pre-compiler 316 may add new source code to cause the compiler to modify the object managers 108 compiled for different host computers 10 to cause them to transmit all requests to create new objects of the class concerned to the particular hosts 10 selected in step 4004.

Security

In a step 4008, the pre-compiler 316 adds new source code to test the identity of the object or process which is invoking a function altering a particular item of data, and to permit access only where the identity is in accordance with the anticipated category of user. Thus, personnel data may be read or written only by personnel terminals for example.

Figure 13:
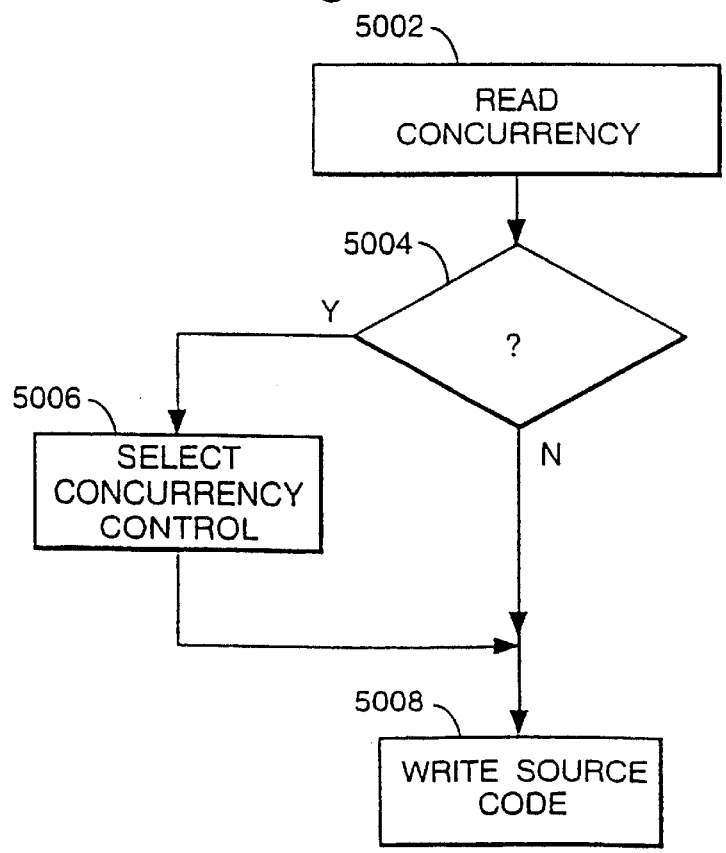
FIG. 13 is a further part of the process.

Concurrency

Where a number of concurrent accesses to data of an object are possible, and a first object accesses another object which may also be accessed concurrently, an inconsistent situation can arise. Accordingly, in preferred embodiments, some means for avoiding inconsistency is provided. Referring to FIG. 13, in a step 5002 the pre-compiler 316 reads, for each class, the number of concurrent processes which may access objects of that class; if no concurrency information is included, or if the number of concurrent processes is explicitly stated to be one, in step 5004, no further action is taken. If the number of concurrent processes exceeds a predetermined number (which may be 2, or may be a higher number) in step 5004 for a given object class, then in step 5006 a concurrency control method is selected for that class, which in this embodiment may be a simple locking process whereby, after an object has been accessed, no further access is possible until the first has terminated.

In step 5008, additional source code is added to the original source code, to cause the compiler to add a locking step to the code for the class concerned.

Timeliness

Each host 10 will be operating a number of processes of different objects in parallel, using a multi-tasking operating system 106.

Figure 14:
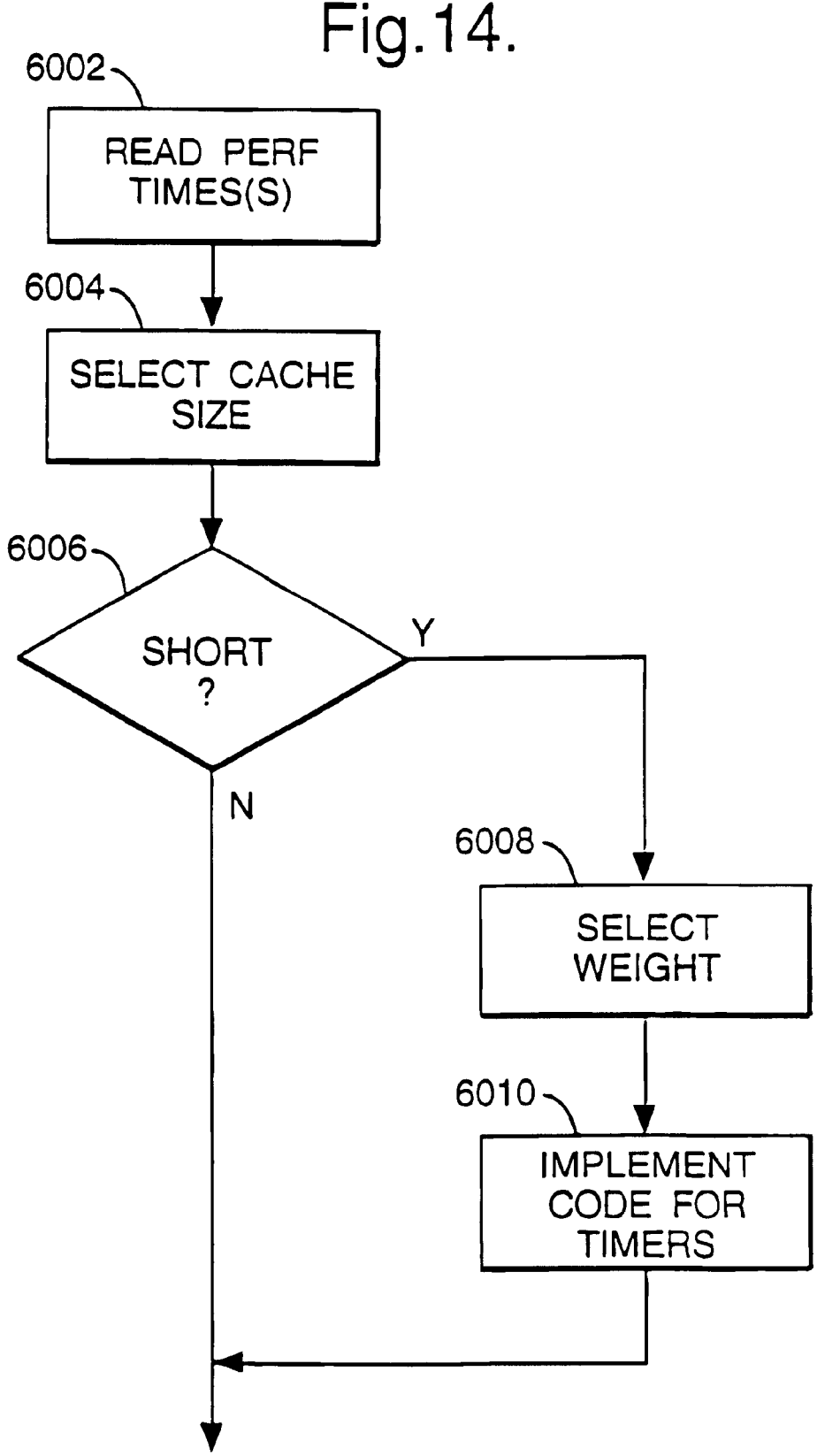
FIG. 14 is a further part of the process.

Referring to FIG. 14, in a step 6002 the pre-compiler reads the performance times associated with each class. In dependence upon the aggregate of all the average performance times, in a step 6004 the pre-compiler includes a compiler directive to establish a cache size for each host computer 10, in accordance with the amount of memory recorded in the systems data memory 318 for each host computer 10, so as to provide a cache size inversely proportional to the aggregate required access times within the available memory.

In a step 6006, it is tested for each class definition whether a short average or maximum performance time is specified and, if so, in a step 6008 a priority weight is selected for that class in inverse proportion to the average performance time, and in a step 6010, source code is added to the code defined for the class concerned to implement a timer which tests whether a predetermined time has elapsed since invocation of the class (or particular function or operation within the class) and if so, aborts the operation.

The weight value selected is written into a list of weight values which is compiled by the compiler for use by the object manager 108 for each host 10, in accordance with which the priority with which each object is to be performed is set, so that objects with relevant long average response times are accorded a relatively low priority wait and are treated as "background" tasks by the operating system 106.

Summary

Thus, after operation of the pre-compiler 316, the extended source code stored in the source code store 308 includes additional source code and compiler directives which implement the functional, or performance, criteria by either:

(a) adding additional code or data to the class code 110, or (b) modifying the object manager code 108 for all of the host computers 10, or (c) instructing the compiler to produce separate versions of the object manager for different host computers 10.

In accordance with this extended source code, the compiler then generates an executable code filed comprising the class code 110 for each declared class in the input source code, and many also include an object manager 108 for each host computer 10.

Rather than compiling code of the object manager 108 for each host computer 10, it is preferable to supply instead a file of data to be employed by the object manager 108 for each host computer 10 to modify the operation thereof.

Thus, when the telecommunications systems is to be changed, for example because of a change to the system information available such as the addition of a new host computer or the extension of memory available on host computers, or because the function of one or more classes of object is to be changed, the precompilation and compilation processes are repeated and the new executable files are transmitted via the wide area network to each host 10, as described above, after local testing as described above.

Where a new host computer is simply added to the system without other changes, a copy of the executable file previously compiled may simply be supplied to the new host computer via the wide area network to cause it to perform in the manner of the existing host computers.

It will therefore be seen that the provision of system specific requirements in statements which will be ignored by first type of compiler (e.g. comments statements) enables simple local testing of the basic functioning of the system prior to its release, thus reducing to a minimum the possible down-time of the host computers 10 when the system is altered in use.

OTHER ALTERNATIVE EMBODIMENTS AND MODIFICATIONS

It will be apparent from the foregoing that many modifications and substitutions are possible. For example, although, for the reasons above, it is convenient to provide the invention as a pre-compiler cooperating with a conventional C++ compiler, it would equally be possible to integrate the present invention into an unconventional compiler (and indeed the combination of pre-compiler and compiler may be considered to comprise exactly this).

Naturally, the invention is usable not only with C++ but with other object oriented languages such as Smalltalk™ which are to be provided in a distributed environment. More generally, it would be possible to utilise equivalent techniques with a non object-oriented language and on a non-distributed system.

Whilst the invention has been described as including the compiler apparatus within a telecommunications system, it will be realised that in practice the compiler apparatus could be in a different jurisdiction and linked to the host computers via an international telecommunications network; accordingly, protection is claimed for the compiler apparatus both in combination with and in isolation from the telecommunications network with which it is used.

Naturally, applications other than telecommunications are possible, such as for example shared distributed computing.

Many other alternatives and modifications will be apparent to the skilled person. Accordingly, the present invention is intended to encompass any and all subject matter disclosed herein, whether or not covered by the accompanying claims.

Our other UK patent application (agent's ref J.23737 GB; applicant's ref A25029, filed on the same date and with the same title as this application) is usable with this invention and is incorporated by reference herein in its entirety.

In particular, the mechanism described therein for creating a type model is preferably extended to include additional data fields for each object which recite the functional performance data recognised according to the present invention which is then supplied as part of the compiled executable code, to be used by each object manager 108. In this way, the same executable program may be supplied to each host computer 10 and the need to use the system in formation stored in the store 318 is obviated.

What is claimed is:

1. A telecommunications network comprising a multiplicity of switches each having an associated control computer, the computers being interconnected and arranged as a distributed control system, and apparatus for compiling control programs for the computers, the apparatus comprising:

a store for current system performance parameters; and a compiler having a first part and a second part, the first part being arranged to respond to comments in an original source program, the comments comprising at least one specified criterion for required system performance, by accessing said store in accordance with said at least one specified criterion to retrieve a corresponding current performance parameter or parameters, evaluating whether the required system performance can be met by the original source program, and, in the event of a negative evaluation result, generating appropriate additional source program statements and compiler directives, and producing a modified source program by incorporating the additional source program statements and compiler directives into the original source program, and the second part being arranged to respond to executable statements in the original source program or, in said event of a negative evaluation result, the modified source program, to produce executable code.

2. A network according to claim 1 in which said second part of the compiler is a conventional compiler, and said first part of the compiler is a separate pre-compiler.

3. A network according to claim 1 in which said computers are arranged to store control data in object records together with associated data read and/or write control programs.

4. A network according to claim 3 in which said at least one specified criterion for required system performance relates to a performance time or times to be achieved by said control programs.

5. A network according to claim 4 in which said performance time or times comprise one or more of a minimum performance time, an average performance time, and a maximum performance time.

6. A network according to claim 3 in which said at least one specified criterion for required system performance relates to the number of equivalent said records anticipated in said system.

7. A network according to claim 3 in which said at least one specified criterion for required system performance relates to the number of access points within the system from which said data records are likely to be accessed.

8. A network according to claim 3 in which said at least one specified criterion for required system performance relates to categories of users who are to be permitted to access said data records or parts thereof.

9. A network according to claim 3, in which said at least one specified criterion for required system performance relates to the extent to which said data must be immediately available.

10. A compiler apparatus for a distributed computing system comprising a multiplicity of interconnected computers, said apparatus being arranged to accept functional requirements for the performance of the distributed computing system and arranged to interpret said functional requirements in accordance with stored data relating to the computers of said system to achieve the functional requirements.

11. Apparatus according to claim 10 comprising means for accepting a source code program in a computing language, and means arranged to read and compile executable statements which are known in said language, characterized by means for reading and compiling further statements constituting said functional requirements for the performance of the distributed computing system, which further statements are contained in comments in said language.

12. Apparatus according to claim 11 in which said language comprises an object oriented language.

13. Apparatus according to claim 12 in which said language comprises C++ or a variant thereof.

14. Apparatus according to claim 11 which comprises a conventional compiler for said language and a pre-compiler arranged to read said further statements and generate corresponding source code, compiler directives and/or other statements for interpretation by said conventional compiler.

15. Apparatus according to claim 11 in which said compiler is controlled to produce multiple executable code output files for performance on different computers of a distributed computing system in accordance with said further statements.

16. Apparatus according to claim 15 in which said compiler is also controlled to produce a single executable code file for performance on a single processor ignoring the content of said further statements.

17. A method of generating code for execution on a distributed computing system comprising a multiplicity of interconnected computers, which method comprises the steps of:
- generating an original source program comprising executable statements defining the structure of said code, and comments comprising at least one specified criterion for required system performance;
- accessing appropriate system performance parameters from a store of the distributed computing system, the store containing current system performance parameters;
- evaluating whether the required system performance can be met by the original source program;
- in the event of a negative evaluation result, generating appropriate additional source program statements and compiler directives and producing a modified source program by incorporating the additional source program statements and compiler directives into the original source program; and
- responding to executable statements in the original source program or, in said event of a negative evaluation result, the modified source program, to produce executable code for execution on said distributed computing system.

18. The method of claim 17 wherein said distributed system is a control system for a telecommunications network comprising a multiplicity of switches, and each of the computers controls a respective one of the switches.

* * * * *